US008972505B2

(12) United States Patent
Zheng et al.

(10) Patent No.: US 8,972,505 B2
(45) Date of Patent: Mar. 3, 2015

(54) METHOD AND SYSTEM FOR MAINTAINING CONTACT INFORMATION

(75) Inventors: Joe Zheng, Cupertino, CA (US); Lei Zhang, Beijing (CN); Yan Yan, Beijing (CN); Yuanxi Zhu, Beijing (CN); Lijun Ma, Beijing (CN); Yong Wang, Beijing (CN); Xiuna Qu, Beijing (CN)

(73) Assignee: Sun Management, LLC ( * ) Notice: Subject to any disclaimer, the term of this patent is extended or adjusted under 35 U.S.C. 154(b) by 1613 days.

(21) Appl. No.: 12/246,507

(22) Filed: Oct. 7, 2008

(65) Prior Publication Data
US 2014/0156760 A1   Jun. 5, 2014

(51) Int. Cl.
*H04W 8/18* (2009.01)
*H04W 8/04* (2009.01)
*G06F 17/30* (2006.01)
*G06F 15/16* (2006.01)

(52) U.S. Cl.
CPC ........... *H04W 8/18* (2013.01); *G06F 17/30867* (2013.01); *G06F 15/16* (2013.01)
USPC ............................. 709/206; 709/204; 709/248

(58) Field of Classification Search
CPC ....... H04L 67/02; H04L 67/283; H04L 51/04; H04L 51/32; H04L 67/306; G06F 17/30867
USPC .......................................... 709/206, 203, 229
See application file for complete search history.

(56) References Cited

U.S. PATENT DOCUMENTS

| 6,782,414 | B1 * | 8/2004 | Xue et al. | 709/206 |
| 7,003,546 | B1 * | 2/2006 | Cheah | 709/200 |
| 7,310,676 | B2 * | 12/2007 | Bourne | 709/227 |
| 7,673,327 | B1 * | 3/2010 | Polis et al. | 726/5 |
| 7,853,657 | B2 * | 12/2010 | Martin | 709/206 |
| 7,958,142 | B2 * | 6/2011 | Li et al. | 707/770 |

(Continued)

FOREIGN PATENT DOCUMENTS

JP    2009289192 A  * 12/2009

OTHER PUBLICATIONS

Wong, Salesforce for Dummies, second edition, Retrieved from the Internet <URL:salesforce.com/assets/pdf/misc/dummies_ch2.pdf>, pp. 1-23 as printed.*

(Continued)

*Primary Examiner* — Michael Chao
*Assistant Examiner* — Feliciano Mejia
(74) *Attorney, Agent, or Firm* — Joe Zheng; Wuxi Sino IPs Ltd.

(57) ABSTRACT

Techniques for synchronizing personal contact information with or from different sources are disclosed. Through a website (i.e., a server or system), all fractional personal contact information is consolidated, synchronized, processed or updated. In return, any of the resources may be synchronized to get a copy of the latest version of the contact information. When contacts in a list by a registered user are also registered with the server, any of the contacts may update their respective contact information that can be timely reflected in the list. As a result, the registered user always has a latest version of the contact information for some or all of his/her contacts without even knowing some has already been changed or updated. Based on the contact information, other features including proof delivery of emails, recycling of deleted contacts, a "black" list, contact relationship levels and anonymous email, short messaging and calls are provided.

18 Claims, 13 Drawing Sheets

(56) References Cited

U.S. PATENT DOCUMENTS

| | | | | |
|---|---|---|---|---|
| 8,000,726 | B2* | 8/2011 | Altman et al. | 455/456.3 |
| 8,190,878 | B2* | 5/2012 | Stern et al. | 713/153 |
| 2003/0135565 | A1* | 7/2003 | Estrada | 709/206 |
| 2005/0076084 | A1* | 4/2005 | Loughmiller et al. | 709/206 |
| 2006/0009243 | A1* | 1/2006 | Dahan et al. | 455/466 |
| 2006/0229063 | A1* | 10/2006 | Koch | 455/414.1 |
| 2007/0255854 | A1* | 11/2007 | Khosravy et al. | 709/248 |
| 2009/0049141 | A1* | 2/2009 | Jones et al. | 709/206 |
| 2009/0082044 | A1* | 3/2009 | Okuyama et al. | 455/466 |
| 2009/0094668 | A1* | 4/2009 | Corbin et al. | 726/1 |
| 2009/0132665 | A1* | 5/2009 | Thomsen et al. | 709/206 |
| 2009/0209243 | A1* | 8/2009 | Brown et al. | 455/418 |

OTHER PUBLICATIONS

Winter, Share Ride Trip Planning with Geosensor Networks, Retrieved from the Internet <URL:citeseer.ist.psu.edu/viewdoc/summary?doi=10.1.1.89.5898>, pp. 1-12 as printed.*

TIA, TIA/EIA-637-A, 1999, Retrieved from the Internet <URL:.tiaonline.org/standards/technology/cdma2000/documents/TIA-EIA-637-A.pdf>, pp. 1-9 as printed.*

Handy, Handy Address Book, 2007, Retrieved from the Internet <URL:.beiley.com/habook/features.html>, pp. 1-9 as printed.*

* cited by examiner

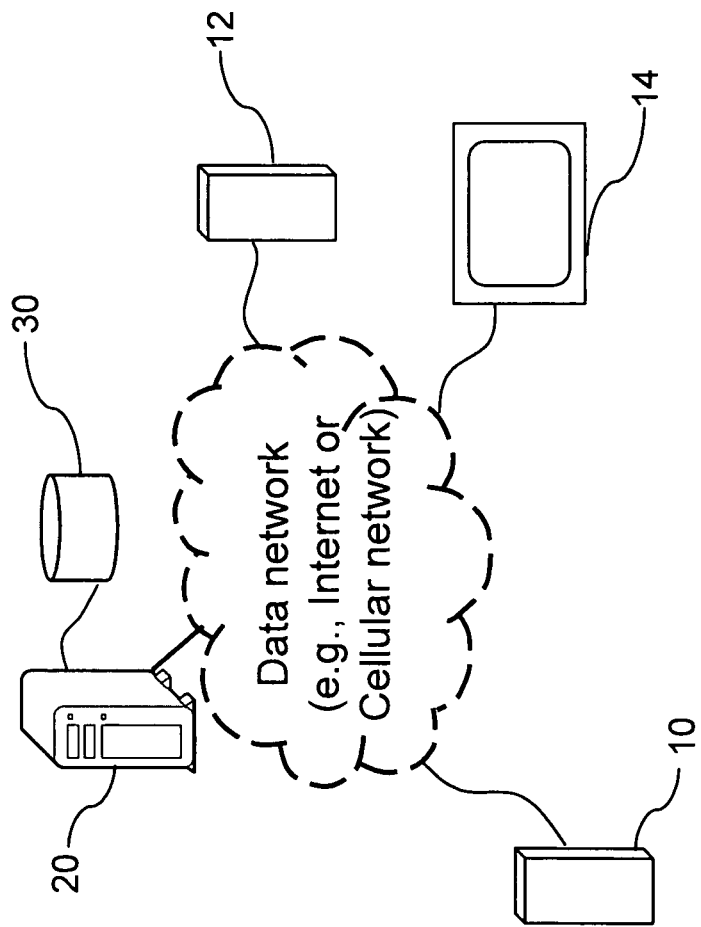

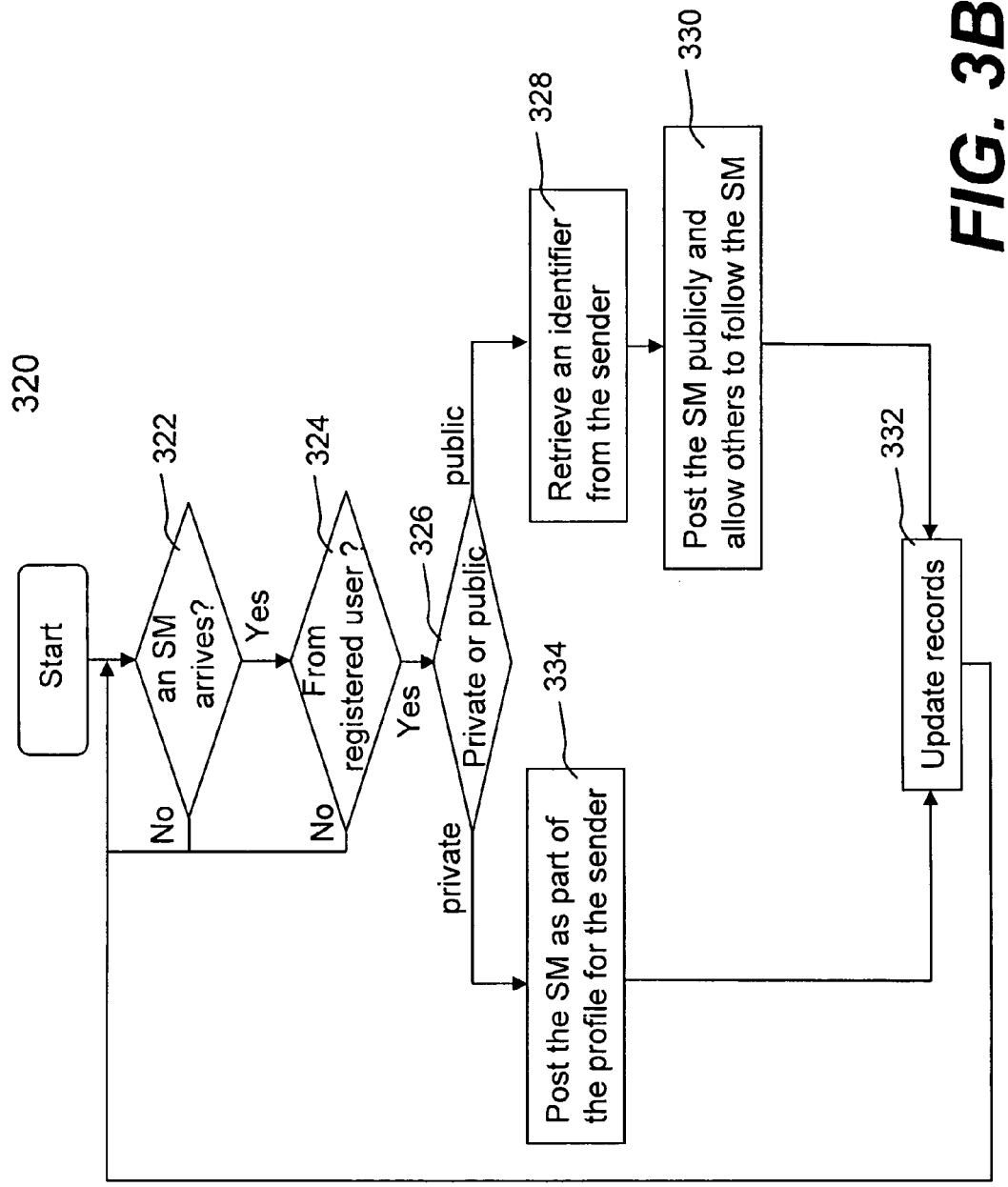

340

Carpool description

Mary Jones
Car description: Mercedes 600 2008
Not-smoker, available for carpooling along the route

| Residence | Cupertino |
|---|---|
| Workplace | Mt. View |
| Time 1 | 6:00AM ~ 7:00AM |
| Time 2 | 6:00PM ~ 7:00PM |
| Highway Entrance | 85 De Anza Blvd |
| Highway 1 | 85 North |
| Highway 2 | 101 North |
| Highway Exit | Shoreline Blvd |
| ● ● ● | ● ● ● |

*FIG. 3C*

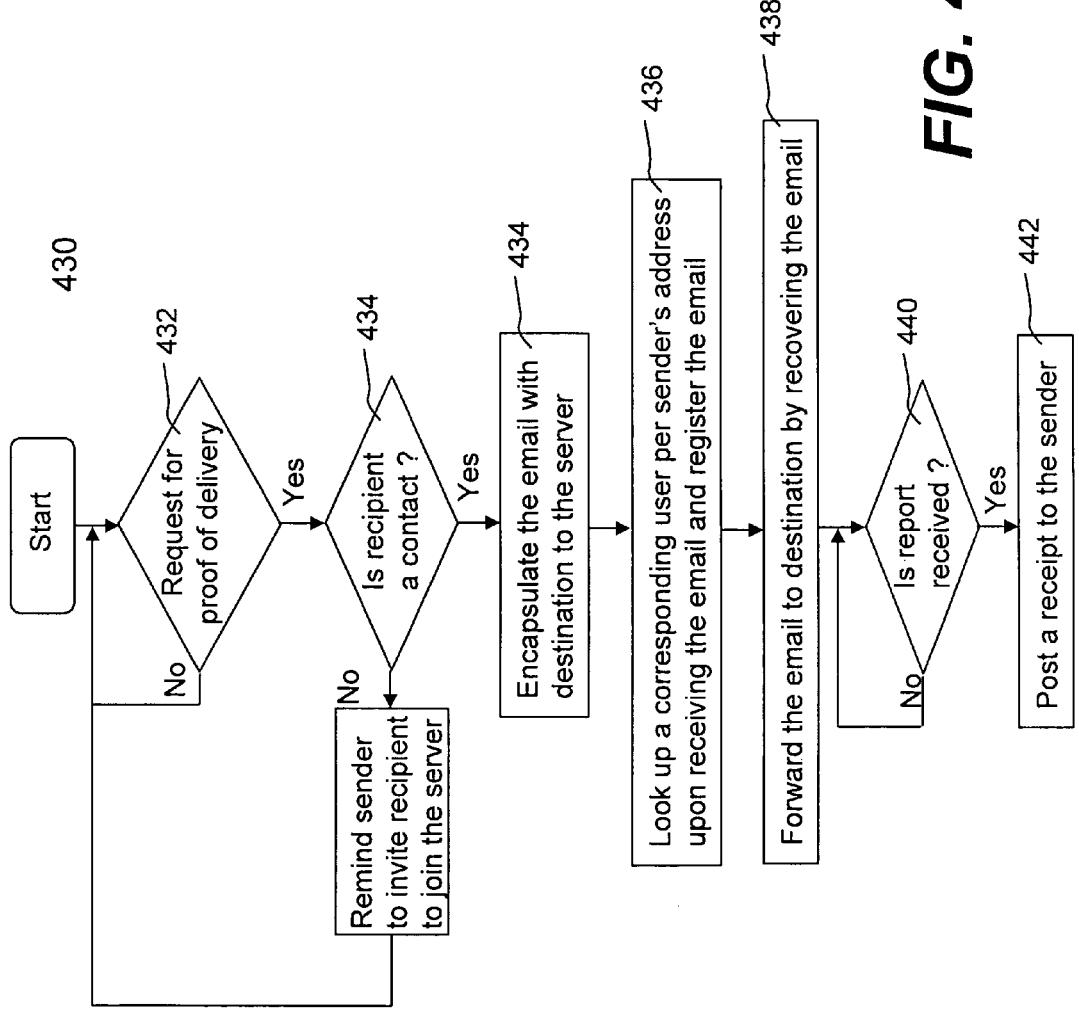

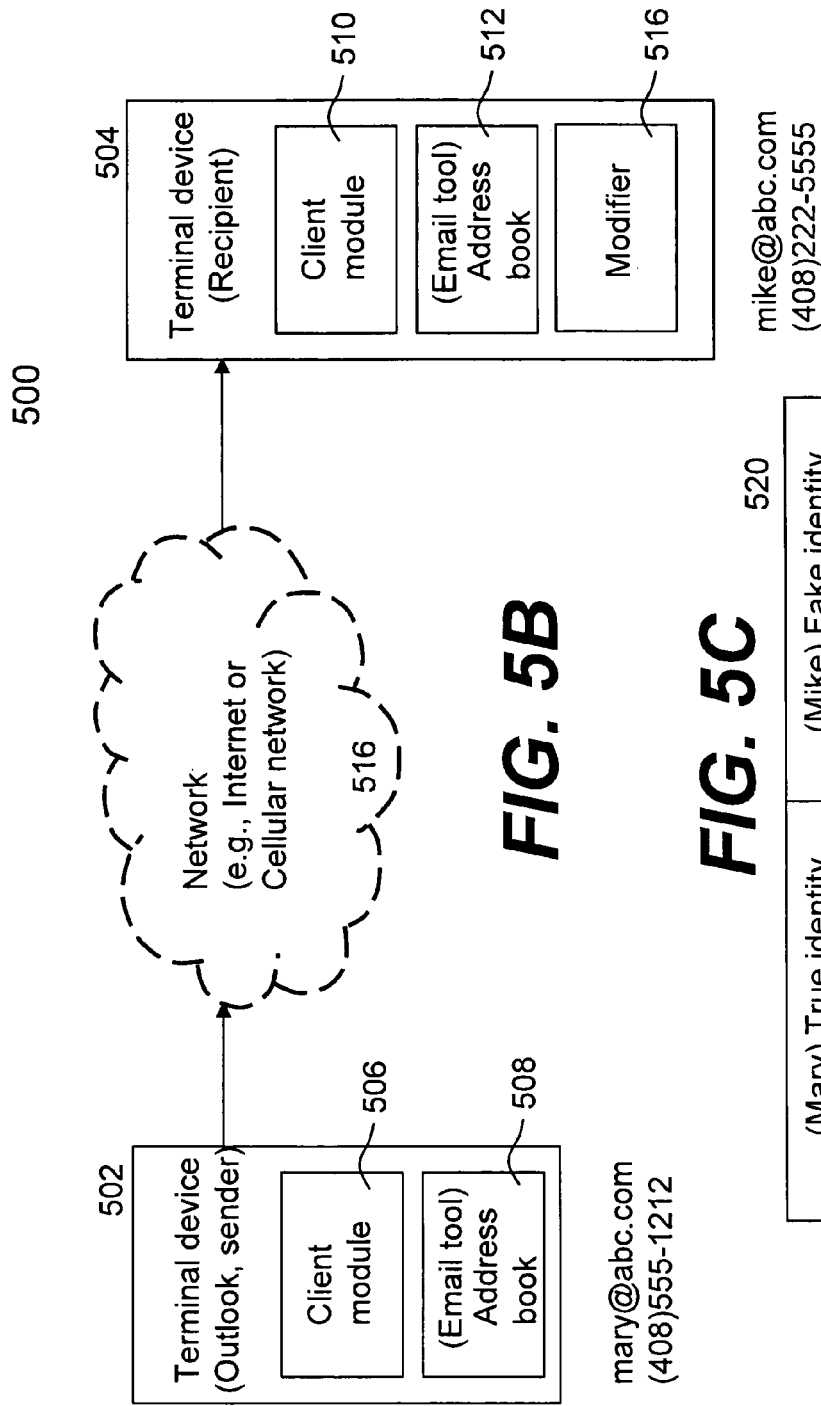

METHOD AND SYSTEM FOR MAINTAINING CONTACT INFORMATION

BACKGROUND OF THE INVENTION

1. Field of the Invention

The present invention generally relates to the area of communication. Specifically, the present invention relates to method and system for synchronizing personal contact information from different sources and mechanisms for registered users to keep back checking their private journals and chatting with others via short messaging. Based on the architecture, other features including proof delivery of emails, recycling of deleted contacts, a "black" list, contact relationship levels and anonymous email and short messaging are provided.

2. Description of the Related Art

It is estimated that an average person with some education background has about four email accounts. Examples of these email accounts include an email account from work, an account from a residential ISP, and several free email accounts from, e.g., AOL, Yahoo, Hotmail and Gmail, each of the accounts established for its own purpose. For example, the email account from work is often used to communicate with other co-workers at work. The account from the residential ISP (e.g., AT&T) may be a serious account to communicate with friends and family members while other accounts may be used for other leisure or purchasing activities. Each account, however, is configured to maintain its own address book to facilitate an account holder to send emails to others without repeatedly entering an email address. Regardless of how many accounts a user has, each address book in an email account is independently managed. If a person happens to be on a business trip and could not access his work account, he could use his other email accounts that may be readily accessed to communicate with his co-workers. However, the person must remember the email address of his co-workers.

Microsoft Outlook or Outlook Express is the most popular email application being used to receive emails from several accounts. It also provides an address book that saves emails addresses when a user sends emails out from Outlook or Outlook Express and manually enters the email addresses. However, Outlook or Outlook Express is often running on a personal computer. When a user is away from the personal computer, the access to the consolidated address becomes difficult. Again, the user has the difficulty to access his address book while away from the personal computer.

Similarly, many people have at least one portable device. For example, a cellular phone allows a user to create an address book that nevertheless is often used to remember a phone number. When a call comes in, the cellular phone allows the user to update the address book with the phone number of the call without actually entering the numbers, all the user needs to do is to enter a contact name for the number. Some other people may also carry a PDA that again is equipped with an address book, recording contact information of others being connected through the device. The dilemma is that the contact information of a person is distributed among several devices or accounts. When a user needs to contact the person by phone, unless the phone used to contact the person before is readily handy, the user has no other way to retrieve the phone number. Likewise, if the user needs to contact the person by email from an account other than the account he normally uses to communicate with the person, he would have no other way to retrieve the email address of the person, unless he remembers or has to make a call to ask the email address.

Technologies have been advanced to the point that people can communicate with others in different ways with different devices/tools. However, due to the lack of coordination among the different ways and different devices/tools, from one perspective, our life is technically complicated. There is thus a need for solutions that can simplify our technically complicated life, for example, one can access contact information from anywhere anytime. If one changes his contact information (e.g., due to job change, phone number change or email change), unless he updates all of his contacts of the change, there would be a possibility that the person may have lost contact with some of his contacts forever. Thus there is a further need for a mechanism that allows a change to be made in a way that all his contacts are immediately updated of the change. To further facilitate communications with or among the contacts, there is yet another need for solutions that keep the communications with or among contacts alive, secured and as often as possible.

SUMMARY OF THE INVENTION

This section is for the purpose of summarizing some aspects of the present invention and to briefly introduce some preferred embodiments. Simplifications or omissions in this section as well as in the abstract or the title of this disclosure may be made to avoid obscuring the purpose of this section and the abstract/title. Such simplifications or omissions are not intended to limit the scope of the present invention.

The present invention is generally related to systems for synchronizing personal contact information with or from different sources. Each of the sources, such as email applications, cell phones or PDA, provides a fractional part of the personal contact information. Through a website (i.e., a server or system), all fractional personal contact information is consolidated, synchronized, processed or updated. In return, any of the resources may be synchronized to get a copy of the latest version of the contact information. According to one aspect of the present invention, contacts in a list by a registered user are also registered with the server. Any of the contacts may update their respective contact information that can be timely reflected in the list. As a result, the registered user always has a latest version of the contact information for some or all of his/her contacts without even knowing some has already been changed or updated.

According to another aspect of the present invention, a mechanism is provided to recover or recycle deleted contacts or block contacts from those listed in a black list. To protect intrusion from those a user prefers not to be contacted by, for example, email, voice or short messaging, the mechanism is configured to automatically delete or block such contact. To facilitate frequent contacting with some or all of the contacts in a contact list or circle, a mechanism is provided to allow a registered user to send short messages from a cell phone or a computing device to keep others updated what the user is up to. The mechanism is also configurable to keep the short messages private to the user, as such the user may send the short messages to the server as a private journal, for example, recording the time, the place and a thought/note on the go.

According to still another aspect of the present invention, the server is configured to allow a user to configure his/her relationship with any of his/her contacts. The user may allow none, some or all of his/her profile to be viewed by his/her respective contacts. On one side of the relationship levels, the user maintains a private relation with a particular contact that may see only the name, an email address and/or a phone number. On the other side of the relationship levels, a complete full profile together with all contact information of the user may be visible to certain contacts, which in one application facilitates business development or professional help with each other. In addition, the relationship level facilitates a group invitation by the user to a group of contacts at one or more particular relationship levels.

As the system is a platform to manage contact information for each of its users having a circle of contacts, there are a lot of services that may be offered by taking the advantages of the nested relationships among contacts. One of the services is to match users or contacts for carpool needs. A mechanism is provided to allow contacts in a circle or all users in the system to carpool to a destination. The mechanism allows users to post carpool offers and carpool requests. The contacts in a circle may match an announced carpool offer and an announced carpool request. The system may also help to match an announced carpool offer and an announced carpool request across different circles of contacts and users.

Among the services being offered, there is what is called proof delivery of email. Email is a common means people communicate with each other, especially for professionals. When it comes to an important email, a sender would like to know that the email was properly received. According to yet another aspect of the present invention, an email is encapsulated to be forwarded to a server that is configured to communicate with a client module executing in a computing device to receive the email. When the email arrives and is accessed, the client module reports to the server with details about when, where and how the email was received or viewed. In one embodiment, the server can be configured to modify an identity of the sender according to a predefined setting so that only a recipient of an email message, a phone call or a short message knows who the sender is and others may not have the idea who has sent the email, the short message or made the call.

The present invention may be implemented in different forms, as a method and a system. Depending on implementation, the present invention may be implemented in modules some of which are executed in a server device, a computer or a portable device. According to one embodiment, the present invention is a method for managing contact information, the method comprises: maintaining a list of records for a registered user, each of the records including a profile of a contact of the user, the profile including at least a last name, a first name, and an email address; receiving data from each of a plurality of sources, the data including a fractional portion of some of records and one or more new records; merging the data with the records so that some fields of the records are updated; and sending the updated records back to each of the resources, wherein each of the sources now has a latest version of the updated records, each of the sources is one of an email application tool, a webmail tool, a cellular phone, a personal computer, and a personal data assistant (PDA).

According to another embodiment, the present invention is a system for managing contact information, the system comprises a server computing device configured to manage a list of records for a registered user, each of the records including a profile of a contact of the registered user, the profile including at least a last name, a first name, and an email address; at least a source, capable of capturing a fractional portion pertaining to one of the records, configured to be synchronized with the server computing device to update the records by merging data received from the source with the records, wherein the data includes the fractional portion pertaining to the one of the records and another fractional portion of a new record, wherein, when the server and the source are caused to be synchronized, the source is configured to cache a copy of updated records including the fractional portion pertaining to the one of the records and another fractional portion of the new record, the source is one of an email application tool, a webmail tool, a cellular phone, a personal computer, and a personal data assistant (PDA), and wherein the updated records further includes a default record, the default record includes a phone number that allows a user of the server to send in a short message from a cell phone.

According to still another embodiment, the present invention is a method for managing contact information, the method comprises: maintaining a database for a plurality of users at a server, each of the users keeping a list of entries, each of the entries including a profile of a contact and corresponding contacting information of the contact, wherein, when the contact changes any of the profile or corresponding contacting information as an update, any of the users listing the contact as one of contacts gets the update automatically, the contact does not have to notify the any of the users about the update; providing a module to be executed in a source capable to capture fractional information about one of the entries, wherein the module is configured to provide proof delivery of email or short message (SM), anonymous contacting by a contact defined to be anonymous, or intercept email or SM from a contact in a black list; and synchronize the list of entries with the source via the module being used by one of the users to ensure that both the server and the source have a latest version of the entries.

There are numerous benefits, features, and advantages in the present invention. These objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1A shows a system configuration in which the present invention may be practiced in accordance with one embodiment thereof;

FIG. 3B shows a flowchart or process of receiving a short message (SM) and posting such an MS as a private journal or public posting;

FIG. 3C shows an exemplary carpool offer to be matched with a carpool request either by a contact or by a system;

FIG. 4B shows a flowchart or process of processing a proof delivery of email;

FIG. 5B shows a configuration that the user may use to modify an identity of a contact that has sent the user an email, a short message and made a phone call; and FIG. 5C shows a table that is provided and can be formed by the user in his account at the server, where the table defines a mapping from a true identity to a fake identity.

DETAILED DESCRIPTION OF THE PREFERRED EMBODIMENTS

Figure 1B:
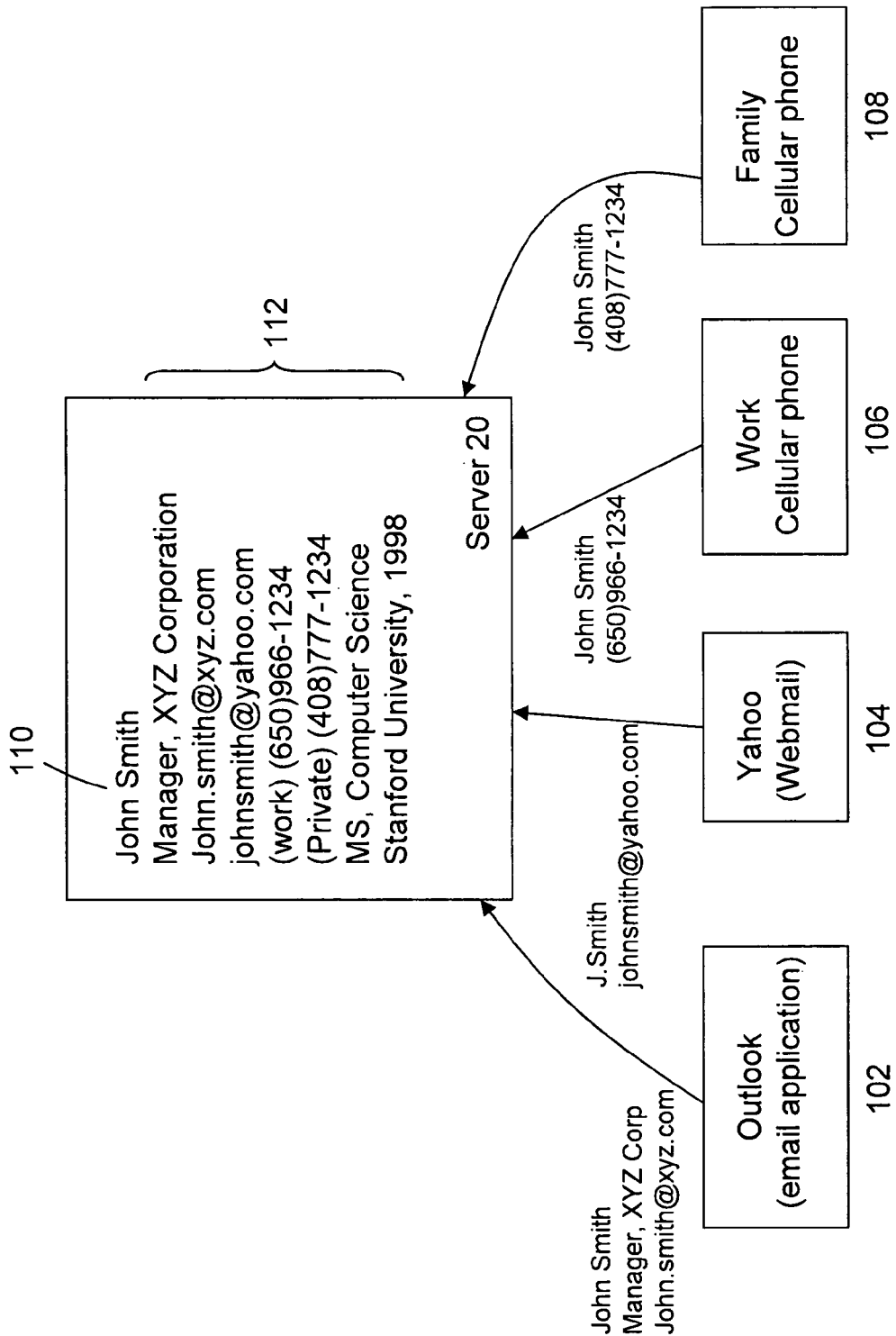
FIG. 1B shows a server synchronizing with four exemplary email tools or devices (collectively referred to as devices)

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-5C. However, those skilled in the art will readily appreciate that the detailed description given herein with respect to these figures is for explanatory purposes as the invention extends beyond these limited embodiments.

FIG. 1A shows a system configuration in which the present invention may be practiced in accordance with one embodiment thereof. In addition to other services being provided and described below, a server 20 is provided to manage synchronized contact information lists for all registered users. A database 30 is provided to support the server 20 to host the synchronized contact information lists and other related data. As used herein, unless specifically stated, contact information lists and address books may be used interchangeably. An entry for one contact includes a profile of the contact besides normal contact information such as email addresses, phone numbers and/or instant messaging identifier. A registered user normally has a list of contacts (a.k.a., a circle of contacts), some or all of the contacts may also be registered users with the server 20. With proper configuration, one user updates his/her profile or contact method, those list him/her as a contact can automatically receive the update with or without the knowledge that this contact has updated some of his/her data.

Depending on implementation, the database 30 may be part of the server 20, distributed among different computing devices or remotely located from the server 20. Terminal devices 10, 12, and 14 representing a plurality of devices that may communicate with the server 20. An example of these terminal devices includes, but may not be limited to, a cellular phone, a PDA (personal data assistant), a PMP (Personal media player), and a computer, all having network capability. A user with any of these terminal devices may communicate with the server 20 to synchronize, manage, update or download an address book maintained on the server 20 specifically for the user.

The server 20 is configured to communicate with devices being used by a registered user to synchronize respective address books residing locally. For example, as shown in FIG. 1B, a registered user may use Microsoft Outlook 102 (i.e., an email application) to receive work related emails, a Webmail 104 (e.g., Yahoo email) to receive personally related emails, a company provided cellular phone 106 for work-related calls, and a private cellular phone 108 for calls with family members or friends. Through an account 110 registered with the server 20, the user may cause each of these email tools and devices 102, 104, 106 and 108, collectively referred to as devices or sources, to be synchronized with the server 20.

The account 110 includes contact information contributed respectively from these devices 102, 104, 106 and 108. For example, the registered user may have used any of these devices 102, 104, 106 and 108 to communicate with a contact named "John Smith". As a result, each of the devices 102, 104, 106 and 108 keeps fractional contact information of John Smith. For example, Outlook 102 keeps some of a profile of "John Smith" as John Smith may have entered some information in his email setting. The profile may include his title, company name, company address, his company email address, phone and fax numbers. The Webmail 104 has his private email address as the registered user may have exchanged emails with John Smith on matters other than the work. Likewise, the cellular phone 106 is often used to speak with John Smith about the work, hence remembering his work cell phone number, and the cellular phone 108 receives sometimes calls from John Smith on his home phone. In other words, each of the devices 102, 104, 106 and 108 maintains fractional contact information about John Smith.

As will be further described below, each of the devices 102, 104, 106 and 108 may be configured to synchronize with the server 20, uploading respective local address books having fractional contact information to the server 20, where the server 20 is configured to consolidates or process the received fractional contact information to form a complete entry 112 with user entered data (e.g., a short profile) in an address book for the registered user. Such an address book may be synchronized to be returned to any of these devices 102, 104, 106 and 108 to supplement the original local fractional contact information or downloaded to a new or another device being used by the registered user.

Figure 2A:
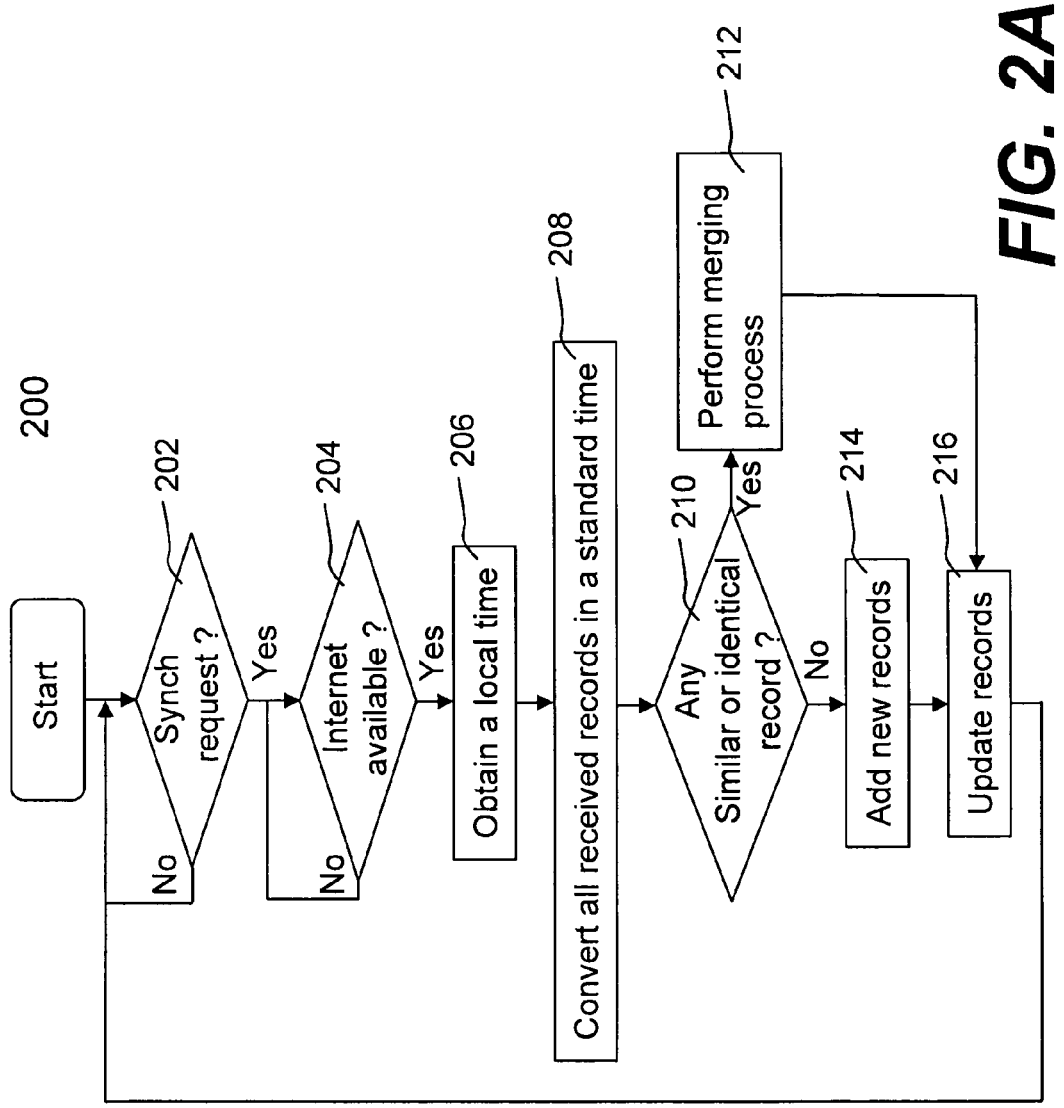
FIG. 2A shows a flowchart or process of consolidating fractional contact data from different sources.

FIG. 2A shows a flowchart or process 200 of consolidating fractional contact data from different sources. An example of the sources includes, but may not be limited to, a computer (e.g., a laptop computer), a cellular phone (e.g., GPRS or 3G phone) and a PDA (e.g., a Blackberry or iPhone). The process 200 may be implemented in software or in combination of software and hardware. To facilitate the understanding of the process 200, FIGS. 1A and 1B may be referenced according to one embodiment of the present invention.

It is assumed that a user named "John Smith" has established an account with a server (e.g., the server 20 of FIG. 1A). The user may access the server from any computer via a data network (wireless or wired) to create a profile of himself. The profile may include his name, his available email addresses, his instant messaging ID, his phone numbers for contacting. Optionally, the profile may include his title, his company name and address alone with product/service areas his company may offer. The profile may also include his educational background (degrees, schools and majors) and other related data that may be of interest to some of his contacts. Affiliated with this account is a list of contacts or entries, thus John Smith has his own circle of contacts that may be constantly updated by respective contacts. Each of the entries has a profile similar to what this account has. Initially, the profiles of the contacts may be incomplete but updateable from time to time by John Smith or the respective contacts themselves. For example, if John Smith has changed his cell phone and received a new phone number. Instead of calling each of his contacts, all he needs to do now is to update his profile with the new cell phone number, those listing him as one of their contacts get the update about John Smith in their lists. Certainly, if John Smith does not want to maintain a relationship with one of his contacts, he may delete it from his list. In one embodiment, the deleted list is kept in a recycle folder to allow John Smith to recover the contact should John Smith accidentally delete the contact without the intent. As a result, the deleted one would not receive the update, neither does John Smith receive any update from the deleted contact. One of the advantages, benefits and objects in the present invention is that the server 20 keeps all users stay in touch with the people they want.

A profile of a contact in a list may be updated by the user as the user comes across something. For example, the area/profession the contact works in is related to communication equipment. Although the particular contact may not provide such information, the user adds the information for the contact and may facilitate him/herself in the future to search for help if there is a need for communication equipment.

It is assumed that the profile is for a contact named "Mary Jones". The same profile may be updated by Mary Jones on her end, provided that she is also a registered user of the server 20. According to one embodiment of the presentation, whenever Mary Jones updates her profile including her contact information (e.g., a phone number change), the update by Mary Jones is immediately reflected in the address book by John Smith. In an event that a data field edited by John Smith is now updated by Mary Jones, the information provided by Mary Jones overwrites what John Smith has written. However, if Mary Jones fills nothing in the data field, whatever entered by John Smith remains.

The registered user "John Smith" may have several devices to communicate with his contacts. As described above, some devices only capture the emails addresses while others only capture phone numbers. At 202, a synch request is made. The synch request may be made individually from each of the devices or from the server, manually (upon a request) or automatically (upon a schedule). When a device is being used, the device may be configured or initiated with proper confidential data (e.g., username/password) to check with the server to see whether there is any update from the server. Likewise, after the user logs into the server, the user may cause the server to synchronize with any of the devices that have been registered and may be synchronized at the time to push an update to a local version of the address book or upload an update to update the centralized version of the address book. In any case, the synch request can only be performed when the Internet access is available. Accordingly, at 204, such accessibility is checked.

It is assumed that the Internet access is available, the process 200 goes to 206 to obtain a local time. Depending on implementation and a terminal device, the local time may be obtained directly or derived from or with respect to the received data. The local time is used to determine which data is newer when comparing data received and data already in the server.

At 208, the timing of the received records is converted to a standard time (e.g., the Greenwich Mean Time (GMT)) with respect to the local time obtained at 206. Because there are so many time zones across the global, data records created or updated may look newer than that archived in the server. The conversion of the time at 208 makes it possible to determine whether the data records created or updated shall update the archived version.

For example, a business man is about to travel from Beijing to San Francisco. Before leaving at Beijing Airport at 11:00 AM January 1, he synchronized his PDA with the server with a new email address of a contact. By the time he arrived at San Francisco airport (SFO), he received an updated email address of the same contact. However, the time he arrived at SFO is 8:30 AM January 1, given that fact that the local time (PDT) in San Francisco is 15 hours behind the Beijing time. The server is configured to determine the second update received is actually newer when all are viewed with reference to the GMT. It should be noted, however, that some devices may simply use GMT. When this is the case, the function at 206 is to verify that the time used is GMT, the function at 208 will not be needed.

At 210, the received entries and the archived entries are compared to detect any updates from either side. When a received entry seems to be similar or identical to a corresponding one in the archived list, the process 200 goes to 212 to perform a merger. For example, a received entry is named after "Mike Doe" while an entry in the archived list is named after "M. Doe". A verification process (not shown) is performed to ensure that these two entries mean the same contact. An example of the verification process is to verify other information in the profile, for example, whether there is an email address in the received entry identical to an email address in the archived list. There may be other data (e.g., a phone number) that may be used to verify if two entries mean the same contact. The process 200 then goes from 212 to 216 to update the entire contact list.

When one received entry is different from any one in the archived list, it means that the entry is for a new contact. The process 200 goes to 214 to add the new entry to the list before proceeding to 216. As a result of the synch request, both the device and the server have a latest version of the address book for the registered user. Whenever John Smith needs to look up for contact information of a contact, he may simply log into the server and search what he needs, he can always get the latest address book. Similarly, John Smith may use a device that has been synchronized with the server to contact anyone in the address book using the latest version thereof. John Smith can also use a different device to synch with the server, the device is caused to download the update or the entire list to the device. From the device, John Smith can get the latest contact information for a person he needs to contact.

According to statistics, there are 60% of cell phone users who change their cell phones each year (e.g., lost cell phone or update to a new phone). In US, there are certain cellular standards that do not support SIM cards. When changing a cell phone without a SIM card, all the phone numbers in the old phone would have to be gone with the phone unless a fee would be paid to ask a dealer to transfer the phone numbers from the old phone to a new phone (which sometimes may not be done because of interface issues). Many GSM cell phones do support SIM cards on which phone numbers could be stored. However, when a phone is lost, all the numbers are lost as well with the phone. Getting a new phone would not recover the numbers. As a result, many people have lost contact with their colleagues or friends because they have lost their cell phones. With the present invention, all a user needs to do is to log into his/her account at the server from a new cell phone via GPRS, 3G or other wireless network. Once the connectivity is established, his/her new phone can download the contact lists from the server, assuming all login information has been successfully verified. In one perspective, the present invention solves the problem of losing contact information when a terminal device is lost or no longer functioning.

Figure 2B:
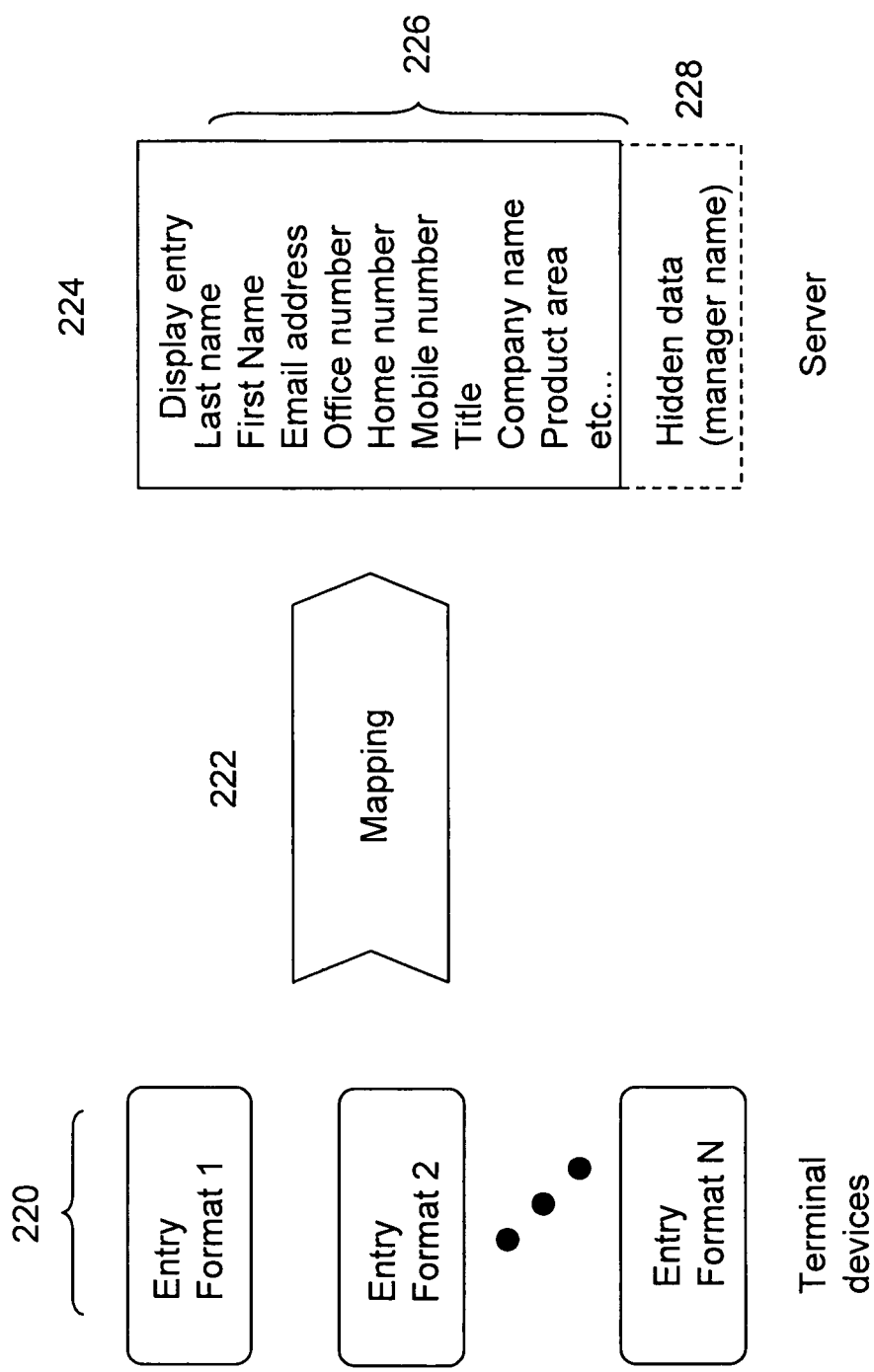
FIG. 2B shows a situation in which an address format is different from that in a server, in which case all data in an entry from a device is transported to the server while some or all of the transported is editable or updated by a user.

FIG. 2B shows a practical situation in which the address format is different from that in a server. An entry in a local address book of one device has more data fields or different fields than an entry in a local address of another device. For example, Microsoft Outlook has fields such as manager's name and assistant's name while Microsoft Outlook Express (OE) does not have such fields but has IP phone number or digital ID that Outlook does not have. Besides the differences in fields of two entries of the same record from two different devices, the same record on a server may have fields that are less or more in number than that from a terminal device.

According to one embodiment as shown in FIG. 2B, there are several entry formats 220 from several devices. A map 222 is provided to bridge the differences among the entry formats 220 and the one used on the server. When a synchronization process happens, a mapping process takes place to map data on the side of the entry formats 220 to corresponding fields defined on the server. Usually, the data fields in an entry on the server includes some of the basic fields, such as last name, first name, email address and etc. as shown in FIG. 2B. These basic fields 226 are displayable and most of them are editable or updatable. For those extra fields from a device that are not needed or required by the server, hidden fields 228 are provided to store the data for the extra fields. These hidden fields 288 are those that may not be seen or editable from the server.

For example, a device is Outlook that has two fields "Manager name" and "Assistant name" that are not used by a corresponding entry on the server. When the device is first synchronized with the server, all data in the entry from Outlook is transported to the server, where only data in the basic fields are extracted to add or update a corresponding entry on the server. Data in other fields, such as "Manager name" and "Assistant name", are kept in the hidden area with the hidden fields. One of the advantages in transporting the entire data in an entry from a device is to make the implementation of the synchronization simple, thus there is no need to perform data selection for synchronization for different devices.

Similarly when an update on an entry on the server is synchronized to a corresponding entry on a local device, an entire entry for a contact including those in the hidden fields is transported to overwrite an outdated entry in the local device. In a different embodiment, only the update may be transported to update a record or entry, in which case, the changes to the entries in a list are transported between a server and a local device.

Figure 3A:
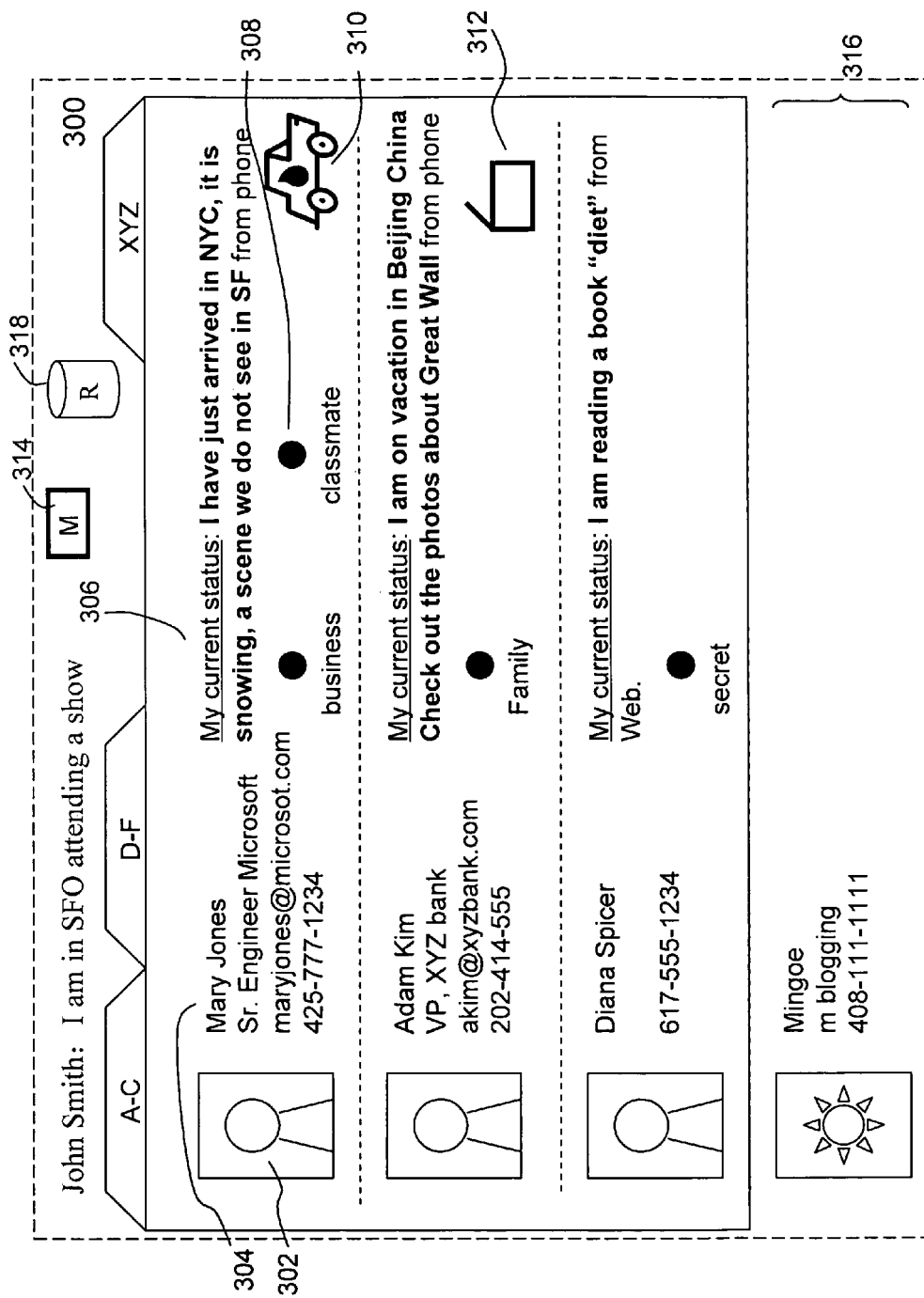
FIG. 3A shows an example list of contacts in an address book by a registered user at a server.

FIG. 3A shows an example list 300 of contacts maintained by a registered user at a server. The list 300 shows three entries or contacts, each showing a photo or a cartoon FIG. 302, a brief indicator 304 of a contact, a status quote 306 and a relationship classifier(s) 308 and icons 310, 312 314, 315 and 318 for personal matters or access to other services offered by the server.

According to one embodiment, a click on either the photo 302 or a name in the brief indicator 304 may show a profile of the contact including all other information about the contact, where the registered user may edit some of the profile. The status quote 306 is provided for the contact to tell others what he/she is doing or concerned about. Likewise, the registered user, assuming "John Smith" may also tell his contacts where he is. His status quote is posted in his contact information in a list maintained by his contacts.

In one embodiment, the status quote allows others to follow or comment on it. Essentially, a mechanism is provided for a user to initiate a brief subject for others to follow or comment it. According to one embodiment, the status quote 306 may be filled in from a cell phone by a short message. The server provides a number to all registered users to send short messages (SM) to the server so that users may send in their own status quote or comment on others while they are on the go. Based on their registered cell numbers, their identifies may be verified before their short messages can be posted accordingly.

In one embodiment, to facilitate a user to send such an SM, an entry 316 similar to a contact in style or format is automatically added into a contact list when a user signs up with the server. The entry 316 includes an icon to indicate a service being provided by the server (e.g., www.mingoe.com), the name for the entry or contact may be simply named after the service name. In addition, a message or slogan may be used in a data field that is commonly displayed nest to the name. According to one embodiment, when such an entry is synched into a cell phone, the record is shown as one of the contacts. A user may simply navigate to the contact and press it to send an SM to the server.

FIG. 3B shows a flowchart or process 320 of receiving a short message (SM) and posting such an SM. The process 320 may be implemented in software or in combination of software and hardware. According to one embodiment, an SM modem is provided and assigned with a phone number. The SM modem allows to receive messages via a cellular infrastructure. The SM modem is coupled to a server (e.g., the server 20 of FIG. 1A) and transport received messages together with the phone numbers from which the messages are received in the server. According to another embodiment, the server is coupled to a cellular infrastructure by an ISP (e.g., AT&T Wireless or China Mobile), the cellular infrastructure transports such an SM directly to the server where a user sends such an SM directly to the ISP.

At 322, the process 320 checks whether there is an SM received and proceeds only when such an SM is received. At 324, the server is configured to determine whether an SM is sent from a registered user. Depending on implementation, the server may allow or disallow short messages sent from those other than the registered users. It is assumed in one embodiment, only registered users are allowed to send an SM to the server. Upon receiving an SM, the phone number from which the SM is sent is looked up in the database to determine whether there is a user associated with the phone number. If no user could be located, the SM is discarded and the process 320 goes back to 322 waiting for another SM.

It is now assumed that the received SM is indeed from a registered user. The process 320 moves to 326 to determine the received SM is private as a journal for the sender (i.e., the registered user) or public as a mobile blog posting. It is assumed that the received message is for public, the process 320 goes to 328, where the server is configured to retrieve an identifier of the sender with reference to the phone number. The identifier may be a last name, a first name or a nick name for others to recognize who has posted this SM. At 330, the SM is posted and a mechanism is provided for others to follow or comment on the SM. For example, a registered user arrives in Beijing and sends an SM "I have arrived in Beijing and will stay here for the next six days" to the server. It is assumed that the user does have some contacts in Beijing, Once such an SM is posted, those contacts in Beijing know that the user is now local and may engage him for gathering or reunion, or even comment on the SM by saying "Welcome to Beijing" or starting SM-based chatting, either from their cell phones or directly from the server. In other words, the status quote or positing is not limited to a phone. A user may very well log into the server to write SM-like messages as his/her own journal or public posting. Accordingly, there is an indication in FIG. 3A to show where an SM is originated from. The process 320 now moves to 332 to update the record for the user, essentially to let the user know how many comments have been posted to follow up on his SM. The user may follow up on newly posted comments.

Returning to 326 where when it is determined that the SM is for private use, the process 320 goes to 334. One of the features, advantages or objects in the present invention is to allow a registered user to write his private journal using SM. For example, a user may tour a place and would like to write down what he sees or what he thinks. It is not convenient to use a notepad, neither to carry with a laptop. With a cell phone, the user can readily write an SM and send it to the server as his private journal. Other applications using a cell phone to send an SM for private use may include setting up a reminder and recording a trace of a journey. In any case, when the received SM is private, the SM is posted as part of the profile for the sender him/herself at 334. The sender may see a sequence of the SM associated with a time stamp and may further comment on one of the posted SM to add comments. The process 320 now moves to 332 to update the record for the user, essentially to show how many comments or messages sent by the user himself.

Referring back to FIG. 3A, a contact "Mary Jones" is classified as a business contact and a classmate contact. Such a relationship level classification is used to define how much information of a profile of a user may be viewed by his/her contacts. In one embodiment, the server is configured to allow a user to configure/or define a relationship level with any of his/her contacts. The user may allow none, some or all of his/her profile to be viewed by his/her respective contacts based on a relationship level. On one side of the relationship levels, the user maintains a private relationship with a particular contact that may see only the name, an email address and/or a phone number (e.g., not the employment information or the profile). On the other side of the relationship levels, a complete full profile together with all contact information of the user may be visible to certain contacts, which in one application facilitates possible business development or professional help with each other at a time there is a need.

In one embodiment, the system has predefined a few levels from "general", "business", "family", "classmate" and "secret", where a "general" contact may see most of the profile while a "secret" contact may see only a portion of the profile. In another embodiment, the system allows a registered to name his/her defined relationship level. For example, a user may define a "College" relationship, thus those contacts labeled as "College" may see full details of a particular portion of the profile of the user, such as educational background and memorable activities at college. As a benefit to the user, such a relationship classification helps the user to sort out from all the contacts those that are labeled by a particular relationship. In one embodiment, the system provides a mechanism to send an electronic invention to a circle of contacts. Instead of going through all contacts, the user needs to decide contacts in what relationship shall get the invitation. As a result, only those contacts fitting into a particular category are selected to receive the invitation. For example, John Smith desires to host a birthday party and invite only his family members. All he needs to do is to make the invitation to all contacts in "Family".

One icon 310 shows that the contact "Mary Jones" is having a carpool offer. Any contacts of Mary Jones may see the offer. According to one embodiment, a click on the icon 310 brings up a carpool description 340 as shown in FIG. 3C. The carpool description 340 shows that Mary Jones makes an offer to her contacts to carpool together during the rush hours. As shown in FIG. 3C, the carpool description 340 describes what car she has, the route information and carpool times. Since the carpool description 340 may be seen only by all contacts of Mary Jones, it is certainly a lot comfortable for Mary Jones to carpool with someone she knows. According to one embodiment, a similar icon (not shown) may be provided to indicate that there is a carpool request. A click on the icon brings up a carpool request description of the route information and desired carpool times. Again because all contacts may see the carpool offer/request and further some or all of profiles of the contacts may be viewed, one embodiment of the present invention offers a great platform to link those who prefer carpools.

Figure 3D:
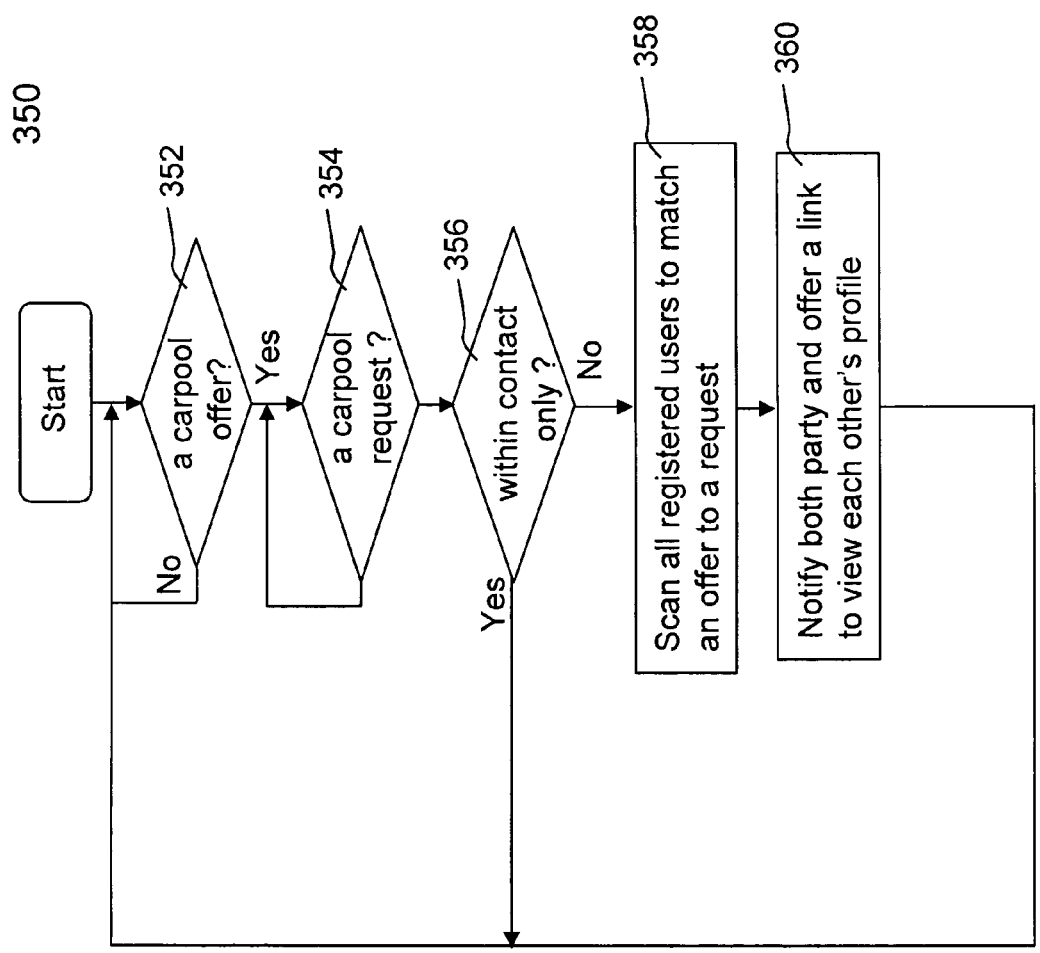
FIG. 3D shows a flowchart or process of matching a carpool offer and a carpool request.

In another embodiment, the server is configured to match a carpool offer and a carpool request based on the information posted by the users registered with the server. FIG. 3D shows a flowchart or process 350 of matching a carpool offer and a carpool request. The process 350 may be implemented in software or in combination of software and hardware. The process 350 starts when there are at least a carpool offer at 352 and a carpool request at 354. At 356, the process 350 determines whether the carpool offer and the carpool requests are for contacts. Some registered users on the server prefer to only carpool with someone he/she knows. If that is the case for the announced carpool offer and carpool requests, the server allows each other's contacts to match among themselves.

Figure 3E:
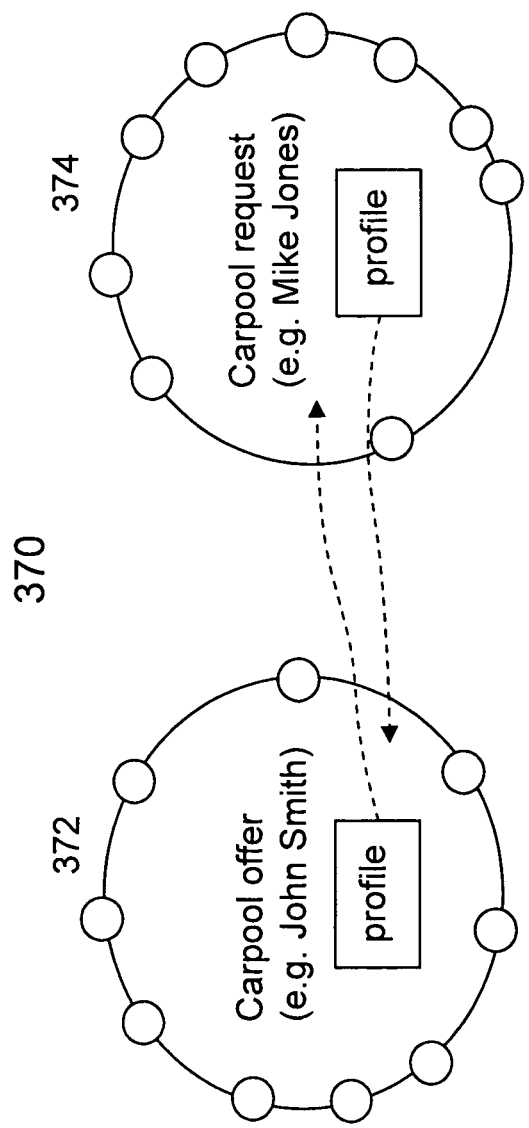
FIG. 3E shows an example of matching two announced carpool offer and requests across two contact circles.

In some situations, a match between the announced carpool offer and carpool requests may not be possible among known contacts, in which case the carpool offer or the carpool request may be matched across all registered users via the server. According to one embodiment, the server is configured to match two announced carpool offer and carpool requests based on the route and time information in the offer and the request. FIG. 3E illustrates graphically an example in which John Smith has made a carpool offer. However, none of his contacts is interested in or fits his carpool offer. Similarly, Mary Jones has also a carpool request, none of her contacts is interested in or fits her carpool request. Both are now willing to go beyond their respective contact circles 372 and 374. Accordingly, the server is configured to scan all the announced carpool offers at 358, performing a match. When the carpool request by John Smith seems to be matched in many of the terms described in each of the offer and request, at 360, the server sends each other a link of the other party and lets each other view a part or all of the profile of the other party. If John Smith and Mary Jones are okay with each other, they may communicate with each other to establish a contact by inviting or adding the other party into their own contact circle 372 or 374. If John Smith and Mary Jones are not okay with each other, the server continues to find a next possible match.

Another icon 312 of FIG. 3A indicates that this particular contact has something to sell or exchange. As a service to its registered users, the server provides a platform for its users to sell or exchange certain items within contact circles or among all registered users. When exchanging something with someone, it is commonly preferable to do so with someone known. In one embodiment, a click of the icon 312 brings up a page or a list to show a number of items being offered for sale or exchange. For example, "Adam Kim" has a hobby of collecting antiques. When Adam Kim decides to give up one of his collections, hoping to get something he desires, he can list the item on his list. As a result, all of his contacts, some of which may have the same hobby as Adam Kim does, can see the list. Thus there is a likely transaction between Adam Kim and one of his contacts. Similarly, the server may be configured to match an offer with a request across all registered users in the system.

Still another icon 314 indicates messages reserved for the registered user "John Smith". Among all possible messages, one type of the messages is receipts for proof delivery of emails transported through the server. Although email has been around for many years, emails sent from one side may sometime never reach another site because of various possibilities including network disruptions. Occasionally, even if an email does reach a recipient, there could be a claim that the email has never received. The sender of the email has no way to verify that the recipient has actually received the email but just claimed the opposite.

Figure 4A:
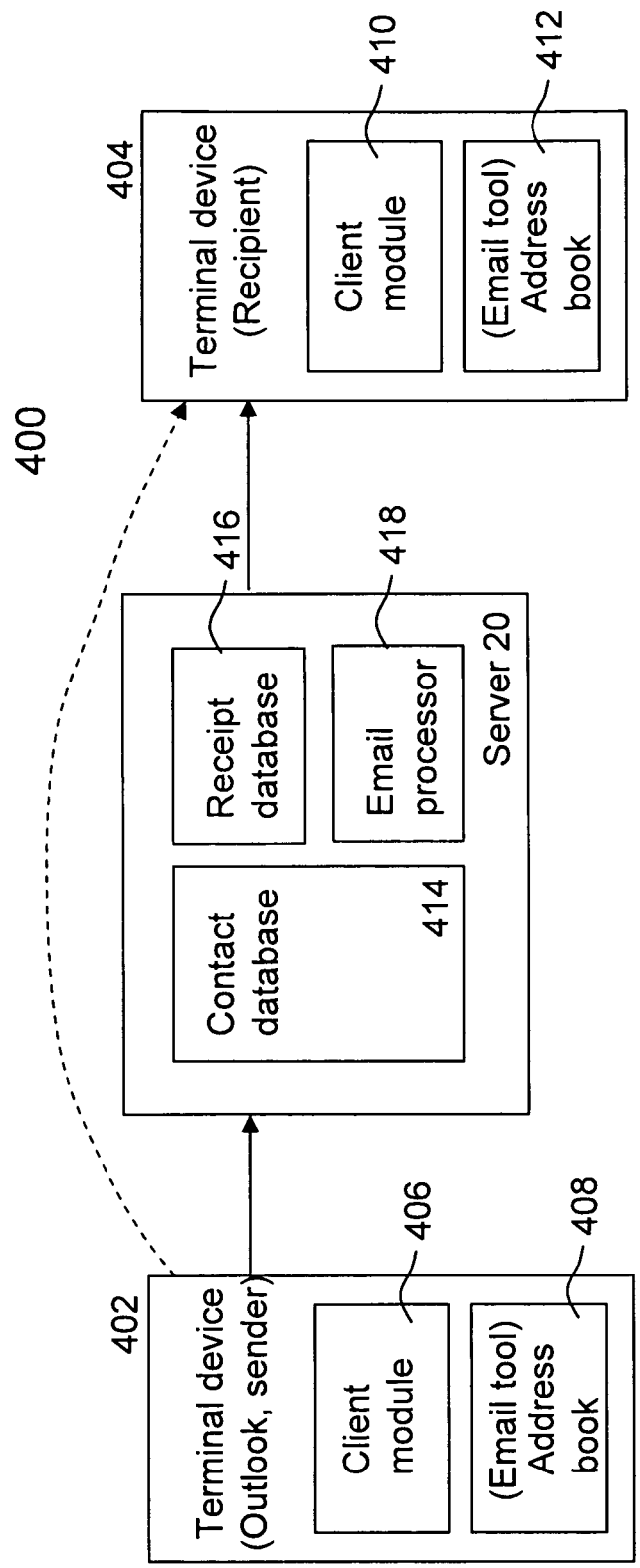
FIG. 4A shows an exemplary configuration of email proof delivery system according to one embodiment of the present invention.

FIG. 4A shows an exemplary configuration of email proof delivery system 400. In a prior art operation, an email sent from a terminal device 402 is transported by an email server (not shown) to another terminal device 404. Different from the prior art operation, a server 20 of FIG. 1A is provided along the path of delivering the email, where the email server is still in existence. As described below, the server 20 provides a proof delivery of an email from the sender (i.e., terminal device 402) to the recipient (i.e., terminal device 404).

The terminal device 402 includes a client module 406 and an address book 408. It is assumed that the terminal device 402 runs an email tool such as Microsoft Outlook. The client module 406 is a plug-in module and runs when the email tool runs. The email tool includes an address book 408 that is periodically synchronized with the server 20 via the client module 406. The terminal device 404 includes similar parts as the terminal device 402 does.

According to one embodiment, the client module 406 or 410 extracts an update or entire data of the address book and sends them to the server 20 and at the same time receives an update or entire data for the address book from the server 20 in a synchronization process. The client module 406 or 410 is configured to detect whether there is a change to the address book. For example, whenever a user receives an email from a new person and responds to the email, the address book captures the new address, resulting in a new entry to the address book. Accordingly, one exemplary update is a new entry from a local address book. In a synchronization process, the new entry is transported to the server, resulting in an update to the centralized address book.

In the context of facilitating proof delivery of email, the server 20 includes a contact database 414 to keep a copy of an address book for each of the registered users, a receipt database 416 and an email processor 418.

In operation, when a user of the terminal device 402 decides to have a proof delivery of an email that the terminal device 404 has received, the user may activate an icon that activates a part of the client module 406 to encapsulate the email and cause the email to go to the server 20 instead of going to the terminal device 404 directly via an email server. The email then goes to the server 20 for registration before it is pulled or pushed to the terminal device 404 from an email server.

When the email finally arrives in the terminal device 404, the client module 410 therein records one or more of the following parameters; a time of when the email has arrived, an IP address of the terminal device 404 that has received the email, and when the email is read. Other parameters that may be recorded include a size of data comprising the email and an application that is used to open the email and etc. The proof delivery can be transported at a specific time or in a next synchronization between the server and the terminal device 404. According to one embodiment, the proof delivery is stored as a system message and may be retrieved by the sender at any time to view the status of the email.

FIG. 4B shows a flowchart or process 430 of processing a proof delivery of email. The process 430 may be implemented in software or in combination of software and hardware. The process 430 may be better understood in reference to FIG. 4A in one embodiment. At 432, the process 430 awaits a request for proof of delivery. The request may be made when a user (sender) decides to send a composed email. For example, in Microsoft Outlook, a superimposed icon is specifically provided and causes the client module 406 to start the proof delivery when the icon is activated or clicked.

It is assumed that the user, also registered with the server 20, has requested to have a proof delivery of this particular email to a recipient. At 434, the client module 406 verifies that the recipient is one of the contacts of the sender by looking through the address book 408 (e.g., those registered with the server 20 are indicated by an icon). If the recipient or the email address of the recipient is not one of the contacts for the sender, the sender is notified at 435, essentially stating that the proof delivery to this recipient can not be performed. In one embodiment, the sender may invite the recipient to join the server 20 as one of the contacts.

It is now assumed that the recipient is one of contacts in the address book 408. At 434, the email is encapsulated in a sense that the email will be redirected to the server 20 first. In one embodiment, the address of the email is prefixed with an address of the server 20. For example, an address of the server 20 is proof@mingoe.com, and the email is going to be sent to mary.jones@yahoo.com. To redirect the email, the email address is modified to include the address proof@mingoe.com, where the original email address mary.jones@yahoo.com is enclosed in this forwarded email to proof@mingoe.com. In one embodiment, this address modification may take place on the way the email is being sent in Outlook. In other words, this address modification is preferably invisible to the sender. Alternatively, the email address proof@mingoe.com may simply appear in the intercepted email "To: proof@mingoe.com [mary.jones@yahoo.com]" as a clear reminder to the user that this email is going to be redirected via proof delivery.

This email now goes to the server 20 because of the modified address. At 436, upon receiving the email, the server 20 is configured to verify that this email is indeed from a registered user and eligible for proof delivery (e.g., selected by the user or there is a sufficient fund). If the user is not a registered user or the email is not eligible for the proof delivery, the sender will be notified. It is assumed that the user is looked up and eligible for proof delivery, the email is now registered with the server 20. This is somewhat in analogy with sending a registered letter via a postal office.

The process 430 goes to 438 to extract the original email address and deliver the email to its intended destination. In one embodiment, the email is now appended with a tag (e.g., a character or script). Once the email is pulled or pushed to a terminal device by which the recipient receives the email, a corresponding client module in the terminal device is activated by the tag to record in a receipt when the email is received, and an IP address of this terminal device is currently using. Should the email be opened, the time is email is opened may also be recorded, and a tool to open the email is noted. For example, the email may be opened in Outlook, Outlook Express, Thunderbird or other tools. The client module is configured to transport the receipt to the server 20 periodically or in a next synchronization process.

At 440, the server 20 detects whether a receipt is received from the terminal device. When such a receipt is received, the receipt is delivered or posted to the sender for the proof delivery. Operationally, the process 430 provides an effective way for proof delivery of email between two contacts in the system.

Referring to FIG. 3A, there is another icon 318 that is provided as a store of deleted contacts. If the icon 318 is clicked or opened, it shows a list of deleted contacts. When a user deletes a contact from his contact list, the deleted contact is not immediately cleaned from the list, instead it is stored in a predefined store for possible recovery by the user in another time. The deleted contact may be a result of an action from the server or from any of the synchronized devices. According to one embodiment, a user logs into his account to view his contact list and may delete one or more contacts for some reason. Although his list is updated with the deleted contacts removed, the deleted contacts are stored in the "recycle" store. In one embodiment, the deleted list may look similar to that of FIG. 3A, but updates from those contacts that have been deleted from the list are no longer available to the user.

Nevertheless, the store allows the user to recycle the deleted contacts should the use desires to reestablish a relationship with the contacts. In one embodiment, the user may clean up a contact list from a portable device (e.g., iPhone). Upon a synchronization process, the server notices that one or more contacts are no longer in the lists. The server is configured to move the "unwanted" contacts to the store. This feature provides a mechanism to allow a user to correct a mistake should a contact is wrongly deleted. If the user does desire to delete the contact, the user may log onto the system to access the recycle store and manually delete those contacts.

According to one embodiment, what is referred to herein as a black list is provided for a registered. As the name suggests, a black list has a list of contacts that the user prefers not to establish any contact with. A contact in a black list may have obtained all contact information (e.g., email address, a cell phone number) for the user. By moving the contact in the black list, emails or short messages from the contact may be blocked or deleted.

Figure 5A:
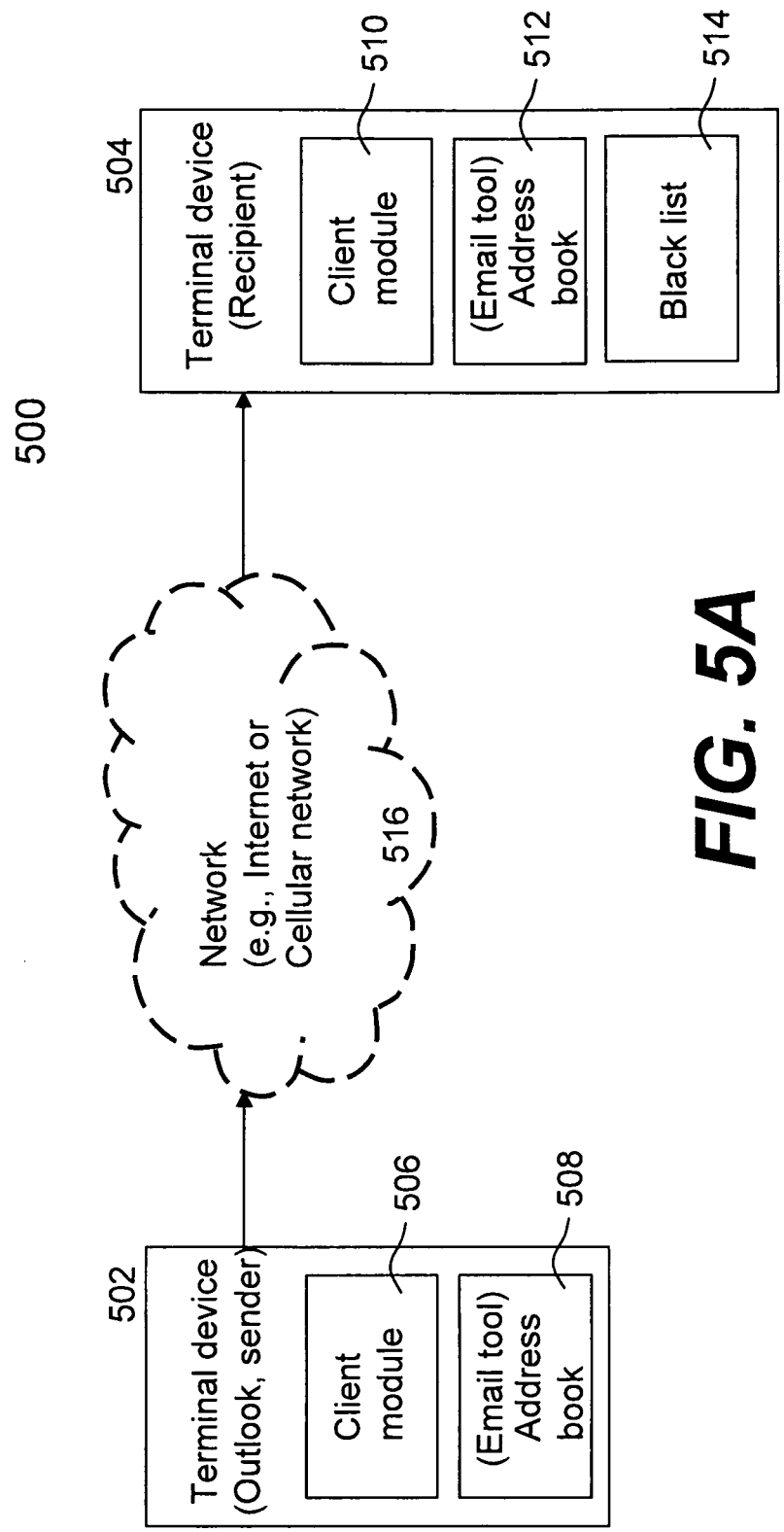
FIG. 5A shows an exemplary configuration of blocking email, short messages or phone call from a deleted contact.

FIG. 5A shows an exemplary configuration of blocking email, short messages or phone call from a deleted contact. It is assumed that a terminal device (e.g., a computer or a cell phone) 502 is being operated by a contact that a registered user prefers not to receive email or short message from. The user of the terminal device 502 is referred to herein as an unwanted contact while the email, short messages or phone call from the unwanted contact is collectively referred to as unwanted attempt. While the registered user uses a terminal device (e.g., a computer or a cell phone) 504 that could not prevent unwanted attempt from the terminal device 502, a client module 510 is designed according to one embodiment of the present invention to block or delete the unwanted attempt sent from the unwanted contact. In addition, the terminal device 504 maintains a black list that includes the unwanted contact. It should be noted that the client module 506 or 510 in both of the terminal devices 502 and 504 may be substantially similar. The terminal device 502 may also keep a black list (not shown).

In operation, an unwanted attempt is initiated by the unwanted contact from the terminal device 502 via a network 516 to the user. When the user uses the terminal device 504 to receive data from the network 516, the unwanted attempt arrives. The client module 510 is activated to check the originality of the unwanted attempt. In the case of the email, the sending email address may be checked. In the case of phone call or short message, the original phone number may be checked. When the sending email address or the original phone number matches one of the contacts in the black list, the client module 510 is activated to delete the email or the short message, so that the user is not bothered to read the email or short message from an unwanted contact. Likewise, when a call from the unwanted contact is received, the client module is activated to mute phone ringing/vibration. As a result, the user is protected from being intruded by an unwanted contact.

In one embodiment, the present invention may also be utilized to protect the privacy of a user. Many phones have a caller ID function to show who is calling or has called. Nearly all email tools show where the emails are from. In some cases, a user prefers not to reveal the identity of the calls or emails as it is often the case that his phone or his email account may be accessed by someone else. According to the embodiment, a registered user is provided a mechanism to hide some contacts in his list. For example, as shown in FIG. 5B, the user has a female contact named "Mary". The user may log into the server to define a map or table to essentially link a true identity to a fake identity. FIG. 5C shows a table 520 that is provided and can be formed by the user in his account at the server. The table 520 defines that all contacting means from Mary would be translated to Mike. Depending on implementation, the table 520 may be embedded in a client module that is downloaded to a device associated with the user when the device is synchronized with the server. The table 520 may be individually downloaded to the device and may be made visible or invisible. Alternatively, the table 520 may be established locally via the client module 510 and synchronized back to the server.

In operation, when Mary uses the terminal device 502 to contact John who has set up the table 510, the true identity of Mary is modified by a local module 516 referred to as a modifier. The modifier 516 may be part of the client module 510 and detects and change the identity of Mary. For example, Mary has sent an email to John using her email address mary@yahoo.com. When the email arrives, the client module 510 determines if the email is from a contact that John prefers not to show the true identity. When it is detected that the arrived email is indeed from such a contact, the modifier 516 is activated to modify the email address according to the table 520. As a result, the email will be shown as if it is from mike@yahoo.com. Should John reply to the email, the modifier 516 intercepts the email and replace the replay address back to mary@yahoo.com.

Similarly, in the case of receiving an SM or a call from Mary, the client module is activated to intercept the phone number from which Mary has sent the SM or made the call. The modifier 516 is activated to modify the phone number according to the table designed by John. As a result, the device being used by John will show a fake ID of the SM or call. Should John reply to the SM or call, the modifier 516 is configured to intercept the SM or call by replacing the faked phone number with the true number of Mary to facilitate the reply to proceed as normal.

In another embodiment, whenever a reply is made, the modifier 516 is not activated to intercept the reply by modifying the fake identity back to the true identity. Instead, the fake identity (e.g., the email address or phone number) is another designated identity for receiving the reply. For example, mike@yahoo.com is a working email address kept by John or someone other than Mary, a replaced phone number "(408)222-5555" is a working phone number but does not belong to Mary. As a result, should the device be accidentally accessed by someone other than John, an attempt to make a reply to a suspicious email, SM or call works but is still unable to find the identity of the suspicious email, SM or call in the device.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

We claim:

1. A method for managing contact information, the method comprising:
    maintaining in a server a list of records for a registered user, each of the records including a profile of a contact of the registered user, the profile including a text field in addition to at least a last name, a first name, and an email address of the contact, wherein the text field allows the contact to edit a personal statement in free form to be shared with contacts of the contact, wherein the server maintains a plurality of registered users;
    posting comments received from some of the contacts in responding to the personal statement by the contact;
    receiving data by the server from at least two sources, the data from each of the at least two sources including a fractional portion of one of records, wherein the server and each of the at least sources are coupled over a data network;
    merging the data for the one of records by operations including:
        filling each of data fields created for the one of records with corresponding information from the data received respectively from the at least two sources;
        creating automatically or by the registered user a duplicated data field for one of the data fields to accommodate a different version of the information meant for the one of the data fields;
        allowing the profile to be annotated in a private text field by the registered user for reminding the registered user what the contact is about;
    synchronizing the records between the server and one of the sources upon a request, wherein the one of the sources has a latest version of the records, each of the sources is one of an email application tool, a webmail tool, a cellular phone, a personal computer, and a mobile device;
    matching an offer from a first one of the registered users in response to a request from a second one of the registered users;
    sending a first link to a profile of the first one of the registered users to the second one of the registered users and a second link to a profile of the second one of the registered users to the first user; and
    making the first one of the registered users to be a contact of the second one of the registered users and the second user to be a contact of the first one of the registered users when the first one and second one of the registered users agree to go with the offer and the request.

2. The method as recited in claim 1, further comprising:
    displaying a status update of the registered user, wherein the status update is provided by the registered user to keep contacts in the records posted of what the registered user is up to;
    posting the status update to some of the contacts of the registered users in the record when the some of the contacts synchronize their respective records with the server; and
    allowing the some of the contacts of the registered users to respond individually to the status update from the registered user.

3. The method as recited in claim 2, further comprising forwarding a response to the status update to the registered user.

4. The method as recited in claim 3, wherein the server is further configured to determine whether the status update was sent from a mobile device or a stationary device.

5. The method as recited in claim 1, further comprising receiving a short message from the registered user in a limited number of words from a portable device, wherein the short message is posted on a webpage allowing one or more users to respond with comments to the short message.

6. The method as recited in claim 1, further comprising receiving a short message from a device associated with the registered user, wherein the short message is posted privately so that no other contacts see the short message.

7. The method as recited in claim 1, wherein each of the records in the server has a predefined number of fields that does not match exactly a number of fields in each of the records in one of the sources, and the method further comprising:
    mapping the data from the one of the sources to the records on the server with reference to a corresponding map; and
    hiding some of the data that is not used in the records on the server.

8. The method as recited in claim 7, wherein said receiving data from one or more sources is initiated from the server or one of the sources, the data includes a difference between the records in the one of the sources and the records on the server.

9. The method as recited in claim 1, wherein the registered user determines how much of the profile thereof is shown to a contact in the list in accordance with a relationship level pre-determined with the contact.

10. The method as recited in claim 1, further comprising inserting a default item in the list of records, wherein the default item provides a mechanism for a user to send in a message from a cell phone to be published on a website.

11. The method as recited in claim 1, wherein the request is related to the second one of the registered users looking for someone in a carpool.

12. A system for managing contact information, the system comprising:
    at least a server computing device configured to manage a list of records for a registered user, each of the records including a profile of a contact of the registered user, the profile including at least a last name, a first name, and an email address, the server computing device also including a specifically marked store to keep some of the records that the registered user has deleted from the list of records, wherein the server computing device is configured to receive fractional data for a record in the list respectively from at least two sources each capable of capturing partial information for the record, the record is created in the server computing device by merging the fractional data from the at least two sources with operations including:

filling each of data fields created for the record with corresponding information from the fractional data received from the at least two sources;

creating automatically a duplicated data field for one of the data fields to accommodate a different version of the information meant for the one of the data fields; and allowing the profile in the record to be annotated in a private text field by the registered user for reminding what the contact is about;

wherein, when the server computing device and one of the at least two sources are caused to be synchronized, the one of the at least two sources is configured to cache a copy of a latest version of the records, the one of the at least two sources is one of an email application tool, a webmail tool, a cellular phone, a personal computer, and a mobile device, and wherein the updated records further includes a default record that provides a mechanism to allow the registered user to send in a short message.

13. The system as recited in claim 12, wherein the server computing device is configured to maintain a predefined store to keep deleted records that are recoverable when the registered user decides to re-establish contact with one or more of the deleted records, wherein the deleted records are not listed in the list of records.

14. The system as recited in claim 12, wherein the server computing device is configured to receive an electronic invitation from one of the at least two resources and forward the electronic invitation to some of contacts in the list of records by determining a relationship level of the registered user with the some of the contacts.

15. The system as recited in claim 12, wherein the server computing device is configured to provide a mechanism to allow a registered user to send a short message from the server computing device to mimic short messaging from a cell phone.

16. The system as recited in claim 12, wherein the server computing device is configured to:

display a status update of the registered user, wherein the status update is provided by the registered user from a mobile device to keep contacts in the records posted of what the registered user is up to;

post the status update to some of the contacts in the list when the some of the contacts log into the server; and allow the some of the contacts to respond individually to the status update from the registered user.

17. The system as recited in claim 12, wherein the one of the at least two sources is executing a client module that is configured to perform operations of:

detecting whether an email, an SM or a call is from a contact listed in a black list;

intercepting the email, the SM or the call when the contact is indeed in the black list by either blocking the email, the SM or the call or removing the email or the SM after the email or the SM has arrived in the one of the at least two sources.

18. The system as recited in claim 12, wherein the one of the at least two sources is executing a client module that is configured to perform operations of:

detecting whether an email, an SM or a call from a contact that is determined to be anonymous;

intercepting the email, the SM or the call when the contact is indeed anonymous by changing an identity of the contact to a fake identity;

displaying the email, the SM or the call only with the fake identity, wherein the identity of the contact is not revealed should the source be accidentally accessed by someone else.

* * * * *